Figure 2:
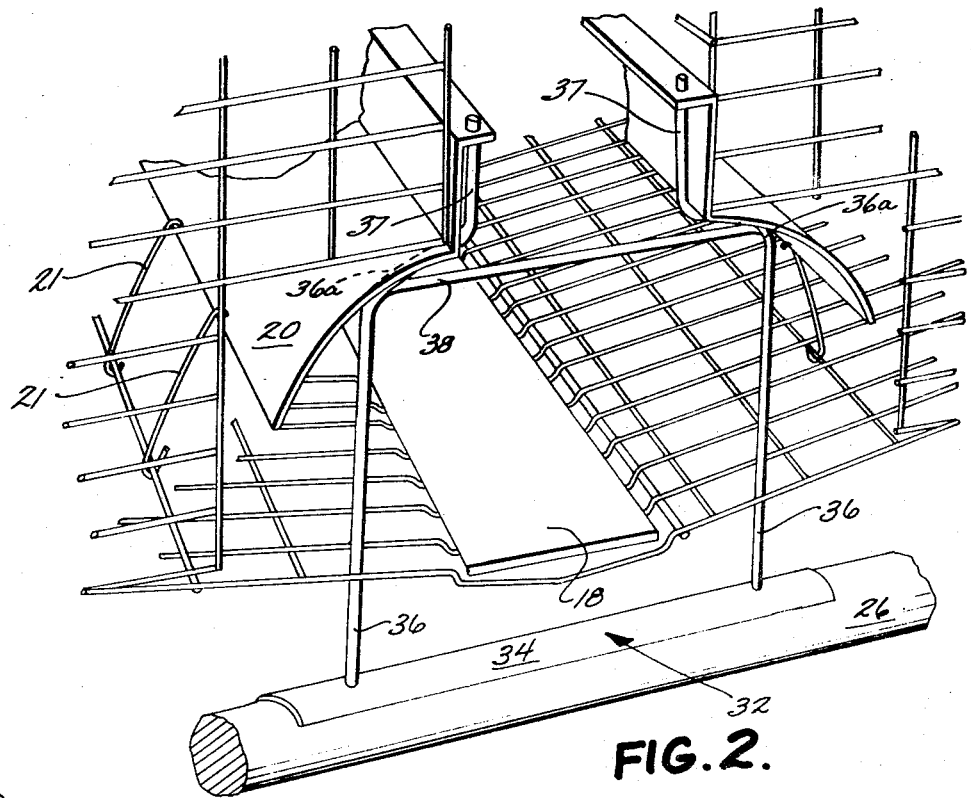

United States Patent

[11] 3,552,359

| [72] | Inventors | Jewel Graves<br>Holland;<br>Willis R. Voran, Zeeland, Mich. |
|---|---|---|
| [21] | Appl. No. | 702,349 |
| [22] | Filed | Feb. 1, 1968 |
| [45] | Patented | Jan. 5, 1971 |
| [73] | Assignee | U.S. Industries, Inc.<br>New York, N.Y.<br>a corporation of Delaware. by mesne assignments |

[54] ANIMAL CAGE SUSPENSION SYSTEM
13 Claims, 2 Drawing Figs.

[52] U.S. Cl. .................................................... 119/48
[51] Int. Cl. ..................................................... A01k 31/16
[50] Field of Search........................................... 119/45, 22; 119/48, 17

[56] References Cited
UNITED STATES PATENTS

| 2,827,875 | 3/1958 | Baumstark ................... | 119/48 |
| 3,208,430 | 9/1965 | Ernst............................. | 119/48X |
| 3,241,523 | 3/1966 | Kurtz et al. ................... | 119/48 |
| 3,274,972 | 9/1966 | Keen et al...................... | 119/48 |

*Primary Examiner*—Hugh R. Chamblee
*Attorney*—Price, Heneveld, Huizenga and Cooper ABSTRACT: A support standard having a crossbar and a pair of spaced legs depending downwardly from the crossbar, with support portions rising from the crossbar at either end thereof to engage only the lateral corners of an elevated poultry confinement cage or, where a pair of back-to-back cages are utilized, as is normally the case, to engage the outermost corner of each such cage and the mutually spaced front walls thereof, with the crossbar extending beneath the floor of the cages at all other points.

INVENTORS
JEWEL GRAVES
WILLIS R. VORAN
BY
ATTORNEYS

ANIMAL CAGE SUSPENSION SYSTEM

BACKGROUND

The raising of poultry within confinement cages for egg-production purposes is rapidly becoming the predominating system in this country in recent times. This is true because many operating efficiencies are realized as a result of both the automated feeding of the birds and the automated egg-collection techniques which this system is greatly conductive to. Normally, the floors of the confinement cages are inclined so that eggs laid within the cages will, under the influence of gravity, roll downwardly to the lowermost edge of the cage, normally located at the front thereof. Openings are provided along this edge so that the eggs may pass out of the cages and onto a conveyor belt located directly adjacent such openings. This conveyor takes the eggs directly to a central collection point, so that the eggs are thus collected from the cages automatically, with no manual effort involved.

The confinement cages are normally constructed of intermeshed wirelike metal rods which, while providing a cage which is adequately strong and sturdy, nonetheless provide for at least some inherent flexibility and resiliency in the wall sections forming the sides and the floor of the cages. However, the cages are normally supported in an elevated position such that they will be self-cleaning, droppings and the like falling directly through the mesh floors of the cages into a pit disposed therebelow, in which automated scrapers or the like operate to periodically clean the pits. The structures which support the cages vertically have always in the past included members upon which the floors of the cage rested in direct contact. This tended to rigidify the cage construction, particularly the floor thereof, and in the past this has always been regarded as being a desirable attribute, since it gave the appearance of making the cage assembly stronger.

In rigidifying the cage floors, however, previous constructions have inadvertently provided a source of extensive egg breakage, incurred as the eggs rolled along the floor under the force of gravity toward the conveyor mechanism noted above. For a long time, this breakage was regarded as an inseparable adjunct of keeping poultry within confinement cages, and in many areas this thought persists even at the present time.

SUMMARY OF INVENTION

The present inventors have determined, however, that the normal or inherent "give" or flexibility of the mesh floor of most cages is sufficient to avoid a great deal of the egg breakage heretofore experienced, if such inherent resilience or flexibility was not restrained, as for example by the typical supportive members against which the cage floor directly rests in conventional equipment.

Accordingly, the present invention provides a support structure adapted to securely hold poultry confinement cages in an elevated position above the floor of a poultry house or the like, while at the same time leaving the floor portion of the confinement cages substantially free of rigid supporting elements located therebeneath, so that the inherent flexibility or yieldability of the cage floors are unrestrained and uninhibited. In essence, the preferred form of the present support apparatus of the invention comprises a series of support stands, each having a pair of spaced legs and a crossbar interconnecting the legs, with supportive portions extending upwardly from the opposite ends of the crossbar to engage the cages only at their outermost corners. Where a pair of closely adjacent rows of cages are being supported, a central supportive portion extends upwardly from the aforesaid crossbar to support the inward walls or sides of the cages. In either event, however, substantially all of the floor of each cage is unrestrained and its yieldability uninhibited.

DRAWINGS

Figure 1:
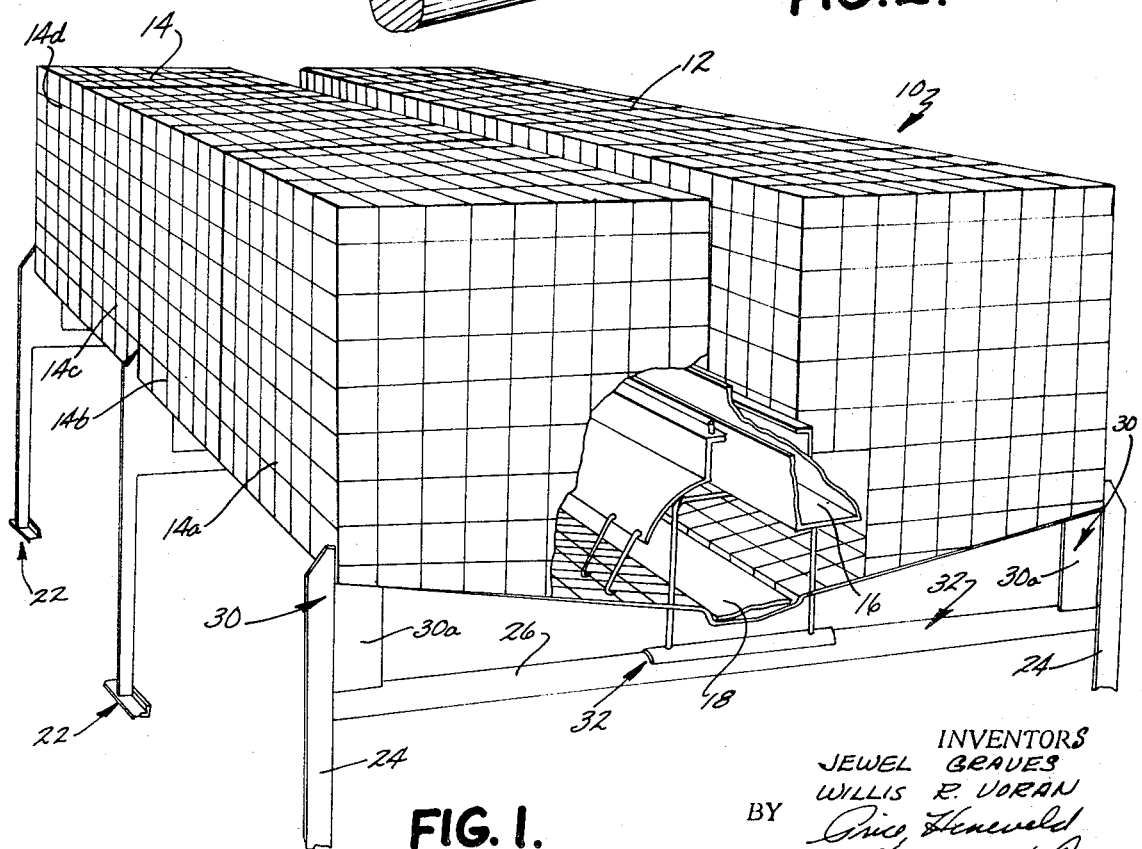

In the drawings:

FIG. 1 is a fragmentary frontal perspective view of a double row of poultry cages mounted in accordance with the support apparatus of the invention; and FIG. 2 is an enlarged, fragmentary perspective view showing additional details of the structure seen in FIG. 1.

PREFERRED EMBODIMENT

In FIG. 1, a confinement cage assembly 10 for poultry is illustrated, the rectangular mesh components of which typify poultry-confining enclosures of the general type found in conventional equipment. These enclosures are arranged in two elongated cage rows 12 and 14 which are mounted in a back-to-back, closely adjacent fashion, with a space maintained therebetween defining an aisle or passage in which a feeder trough 16 may be located and in which automatically refillable watering troughs (not specifically shown) may also readily be mounted. As will be appreciated, the feeder trough 16 conventionally forms a part of automated feeding equipment, in which a flat conveyor chain or the like periodically moves through the trough to maintain a supply of feed therein for the birds within the cages. As will also be appreciated, each of the lines or rows of cages 12 and 14 is comprised of a series of mutually independent cage segments or units, such as are designated 14a, 14b, 14c, and 14d, each sharing elongated and generally flat top, bottom, front, and rear walls but being separated from the other adjacent cage units or segments by appropriate divider walls made of the same type of mesh wire material as the other walls of the cages.

The floor for each of the mutually independent cage segments in both of the spaced-apart rows 12 and 14 thereof may conveniently be formed of a single integral sheet of mesh material (FIG. 2), which extends across the bottom of the opening between the front walls of the cages in the two opposite rows 12 and 14, to interconnect the two cage rows into an integral unit. The portion of this common floor beneath the aforesaid aisle between the two spaced rows of cages provides a bed for a conveyor belt 18 by which the eggs are automatically collected from the cages, and for this purpose this central portion of the floor is preferably offset downwardly slightly to form a shallow U-shaped depression which receives the belt 18 and guides it as it moves along.

Each of the aforesaid front or interior walls of the cages in the two rows thereof terminates somewhat above the common floor portion, and an elongated downwardly concave sheet metal egg guard 20 is attached to each cage row within the space between these walls and the floor. This egg guard is secured along its lowermost edge to the floor by a series of hooklike wire link members 21, but the lowermost edge of the egg guard terminates sufficiently above the floor to allow room therebetween for eggs laid within the cages to roll down the floor, which is inclined with respect to the horizontal, pass beneath the lowermost edge of the egg guard, and roll onto the belt 18 for automatic collection. All of this is generally known in the art and need not be elaborated; however, the particular configuration of the egg guard shown at 20 is an innovation in this field, and this member is specifically disclosed and claimed in copending application Ser. No. 692,841, filed Dec. 22, 1967, assigned to the assignee of the present invention.

The most preferred embodiment of the cage-supporting apparatus of the invention comprises a series of mutually independent, spaced support standards 22 (FIG. 1), each of which preferably has a pair of upright legs 24 interconnected by a crossbar 26 which is substantially as wide as the cage assembly 10. Preferably, each of the legs 24 has a transverse foot 28 at its bottom extremity, by which the entire standard 22 is stabilized and by which the same may be made to be freestanding. The standards 22 are preferably made of a suitable metal stock such as angle steel or the like.

Atop the interconnecting member or crossbar 26 of each support standard, and near the opposite ends thereof, a pair of supportive portions 30 extend upwardly and engage the outside lower corners of the cage assembly 10 (FIG. 1). As illustrated, the supportive portions 30 may be provided by forming the support standards 22 in a generally H-shaped configuration, such that the uppermost extremities of the legs 24 extend beyond the crossbar 26. In this configuration, however, interior rib portions 30a are secured immediately inwardly of the top of the legs. The portions 30 preferably have an inclined top surface corresponding to the inclination of the cage floor, whereas the part of the supportive portion 30 extending above the interior portions 30a are vertical and fit directly against the outermost or rearward sides of the cages in the rows 12 and 14. That is, the supportive portions 30 and their rib portions 30a together form a notchlike shoulder which receives a corner of the cage assembly, but neither the supportive portions 30 nor the ribs 30a extend appreciably along the underside of the floor thereof.

A third supportive portion 32 is located centrally of the support standards 22, extending upwardly from the center of the crossbar 26 to support the interior portion of the cage assembly, beneath the two closely adjacent front cage walls. The central supportive portion 32 has a base 34 which fits over the top of crossbar 26 and which mounts a pair of spaced, upstanding rodlike elements 36, which extend upwardly from base 34. Each of the rodlike elements 36 has a cranklike offset 37 near its upper extremity (FIG. 2), and the two rodlike elements are rigidly interconnected by a connecting member 38 extending therebetween. As illustrated in FIG. 1, connecting member 38 may be utilized to support the feeder trough 16 in place, as well as to interconnect the upstanding rod 36 and rigidify the supportive portion 32.

Each of the generally right-angled offsets in rods 36 provide a support shoulder 36a which lies in contact with the underside of the egg guard 20, to vertically support the front sides of the cages at this point. Also, the upper extremities of the rods 36, beyond the angular offsets and the shoulders 36a, are arranged to extend vertically upward through appropriate apertures in the upper edges of the egg guards 20, for further supportive function which restrains any threatened lengthwise movement of the cage assemblies. In this connection, it will be noted that the upright rod elements 36 preferably extend through one of the openings in the mesh floor of the cage assembly (FIG. 2), to thereby further restrain any lengthwise movement of the cage assemblies.

Due to the suspension or mounting arrangement just described, the central or interior portion of the cage assembly 10 is in effect supported beneath each of the front sides of the cage segments or units in each of the two parallel rows thereof; that is, the central support means 32 engages beneath the egg guards 20, which in turn engage beneath the bottom edges of the respective front sides or walls. As will be observed, however, the central supports 32 do not actually engage the underside of the cage floor, which thus is in effect freely suspended between the two end supports 30 at either side of the cage assembly. Furthermore, the end supports 30 and their attached ribs 30a may conveniently be located in direct vertical alignment with the sidewalls which segregate the mutually independent cage units of which each of the cage rows 12 and 14 is comprised. This affords maximum freedom from restraint for the floor, since in actuality there are no rigid and unyielding supports or braces whatsoever which extend beneath and lie in contact with its underside. In the broader connotations of the invention, however, the central support means 32 could engage that portion of the floor which carries and guides the egg-collection belt 18, since this would not unduly affect the flexibility of those sections of the floor defining the bottom of each distinct cage portion.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

I claim:

1. Apparatus for supporting elevated confinement cages for poultry, of the type having a floor and sides, including front and rear sides, in a manner providing maximum flexibility in the floor thereof, said apparatus comprising: a support means including a first supportive portion engaging such cage at its said rear side, to vertically support the rear portion of the cage; an egg guard connected to said cage floor and engaging at least portions of said front side from underneath such portions, to support the floor and front side; said support means including a second portion comprising a supporting and positioning member, such member engaging said egg guard from underneath and including an offset portion detachably engaging the egg guard so as to vertically support the weight of the front extremity of the cage on said egg guard; and said support means including a third portion connected between said first and second portions thereof and bracing the same to maintain their respective positioning at the rear and front of the cage; such that said support means is free of said cage floor beneath such cage and between the areas of engagement of said first and second supportive portions, whereby the inherent flexibility of substantially all of said floor is essentially unrestrained and uninhibited.

2. The apparatus of claim 1, wherein said first supportive portion of said support means engages parts of said floor and parts of said rear side at the juncture thereof.

3. The apparatus of claim 2, wherein said egg guard engages said front side near its lowermost edge.

4. The apparatus of claim 3, wherein said third portion of said support means extends beneath said floor and is spaced therebelow between said first and second portions.

5. The apparatus of claim 4, wherein said support means further includes at least one leg element extending downwardly beneath said third portion for contacting the floor of a building housing said cages and thereby holding such cages in an elevated position.

6. The apparatus of claim 1, wherein said egg guard member extends lengthwise of such cage and effectively forms the lowermost extremity of said front side.

7. Apparatus for supporting elevated confinement cages for poultry, of the type having a floor and sides, including front and rear sides, and a member extending longitudinally of said front side and adjacent a lower portion thereof in a manner providing maximum flexibility in the floor thereof, said apparatus comprising: a lower support means extending in spaced relation beneath such cage from one side to another thereof; said support means including a first supportive portion extending upwardly and engaging such cage at the rearward edge of said floor, generally adjacent said rear side, to vertically support the rear portion of the cage; said support means including a second supportive portion extending upwardly through the level of said floor and detachably engaging said member adjacent said front side, to vertically support the front portion of the cage; and said support means being free of said cage floor beneath such cage and between the areas of engagement of said first and second supportive portions, such that the inherent flexibility of substantially all of said floor is essentially unrestrained and uninhibited.

8. Apparatus for supporting an elevated poultry confinement cage assembly, of the type having at least two mutually independent cage enclosures arranged opposite each other in front-to-front relationship, each such enclosure having a floor, a front side, and a rear side forming a lateral extremity of such cage assembly, said apparatus comprising: a support means including a first supporting portion engaging one of said cage enclosures at the rear side thereof, to vertically support the cage assembly at that lateral extremity thereof; said support means including a second supportive portion engaging the other of said cage enclosures at its rear side, to vertically support the cage assembly at that lateral extremity thereof; each of said cage enclosures including an egg guard connected to the floor thereof and engaging at least portions of the said front side thereof from underneath such portions, to support the floor and front side of each such cage enclosure; said support means further including a third supportive portion located centrally between said first and second supportive portions and defining supporting and positioning members for engaging said egg guards of said two cage enclosures from underneath and including offset portions detachably engaging the egg guards to vertically support the weight of the central part of said assembly on said egg guards; and said support means being free of and out of contact with the floor portion of each of said cage enclosures between the areas of engagement of said supportive portions, such that the inherent flexibility of substantially all of said floor is essentially unrestrained and uninhibited.

9. The apparatus of claim 8, wherein said third supportive portion includes elongated extremities which extend upwardly through the plane of said floor.

10. The apparatus of claim 8, wherein said first and second supportive portions of said support means each engage parts of said floor and parts of said rear sides at the respective juncture thereof.

11. The apparatus of claim 8, wherein said supportive means further includes a member interconnecting said first, second and third supportive portions, said member extending beneath the floor of each of said cage enclosures and being spaced therefrom between said portions.

12. The apparatus of claim 11, wherein said support means further includes at least one leg element extending downwardly beneath said interconnecting member for contacting the floor of a building housing said cage assembly and thereby holding said cage enclosures in an elevated position.

13. The apparatus of claim 8, wherein said two cage enclosures are spaced apart from each other at least slightly to accommodate poultry-feeder trough means therebetween, and wherein said third supportive portion of said support means includes structure for contacting and restingly supporting such feeder trough means.